United States Patent
Gignac

[15] 3,703,297
[45] Nov. 21, 1972

[54] ARTICULATED LINK SEALS
[72] Inventor: Robert J. Gignac, Belleville, Mich.
[73] Assignee: Thunderline Corporation, Wayne, Mich.
[22] Filed: Dec. 22, 1970
[21] Appl. No.: 100,634

[52] U.S. Cl. .................. 277/166, 277/199, 285/346
[51] Int. Cl. ........................... F16j 9/16, F16j 15/02
[58] Field of Search......277/102, 104, 120, 166, 199, 277/124, 235; 305/35 R, 36; 285/346

[56] References Cited

UNITED STATES PATENTS

| 3,528,668 | 9/1970 | Barton | 277/199 |
| 2,059,247 | 11/1936 | Knox | 305/36 |
| 2,558,050 | 6/1951 | van der Maelen | 277/166 |
| 3,045,830 | 7/1962 | Fulton | 277/102 |

Primary Examiner—Houston S. Bell, Jr.
Attorney—Kinzer, Dorn & Zickert

[57] ABSTRACT

An annular shock-absorbing fluid seal assembly including a plurality of modular seal blocks of resilient elastomer material compressed in one direction to cause expansion in another direction and seal the outer surface of a conduit to the inner surface of an opening through which the conduit projects. Two pressure plates span the joint between each adjacent pair of seal blocks, on opposite sides of the blocks, and are joined by bolts that extend through the blocks, the bolts and pressure plates joining the blocks in a ring as well as compressing the seal blocks. One embodiment uses two bolts for each pair of pressure plates; another employs arcuate guide ribs on the pressure plates that fit into complementary grooves in the seal blocks.

5 Claims, 6 Drawing Figures

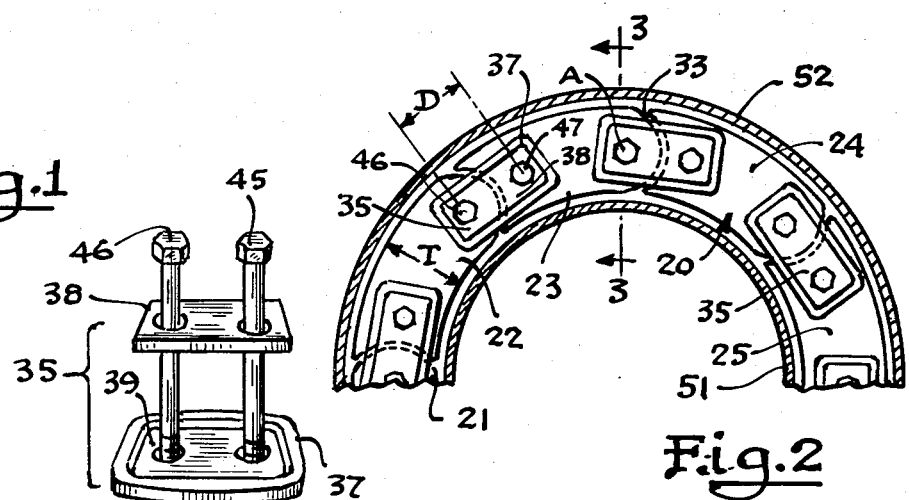
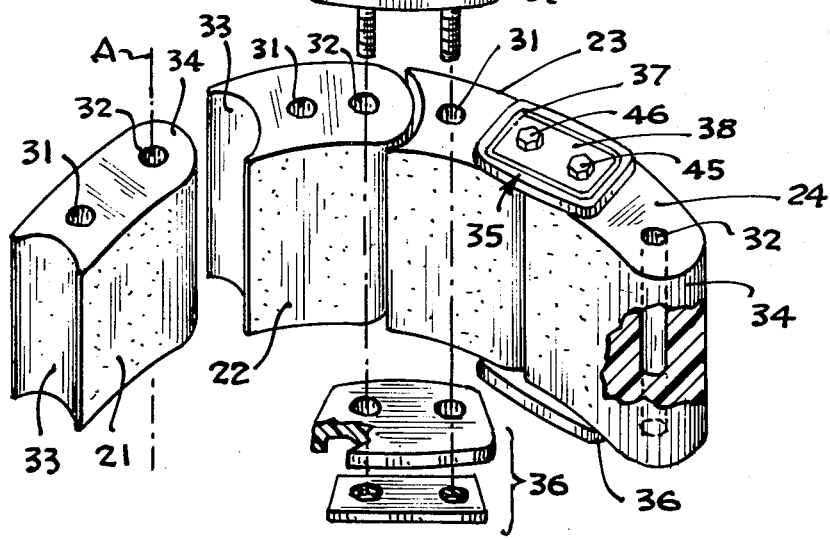
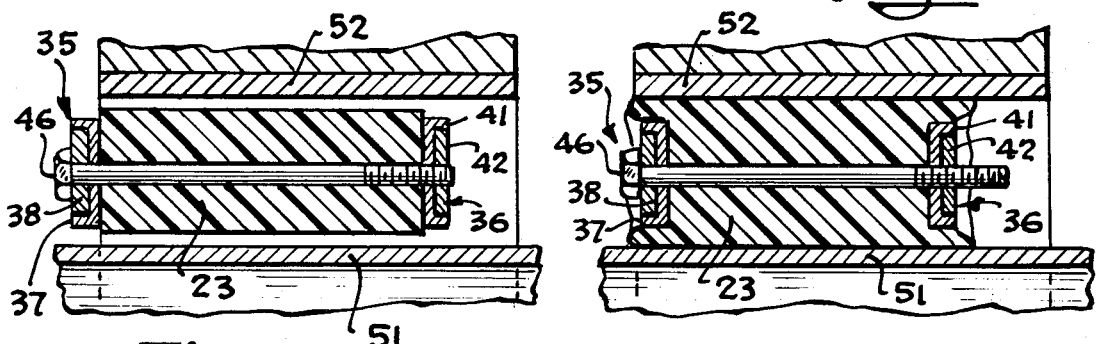

Inventor
Robert J. Gignac
By Kinzer, Dorn and Zickert
Attorneys

ARTICULATED LINK SEALS

BACKGROUND OF THE INVENTION

A. Field of Application

There are a variety of different applications in which it is necessary to afford a liquid-tight seal for an electrical conduit, a pipe, or other conduit that extends through a wall or into a larger conduit such as a culvert. Typical examples are underground electrical vaults, pits, tunnels, bridges, pipelines, and the like. In addition to sealing the external surface of the conduit against egress or ingress of water and other liquids, it is frequently necessary to provide for shock absorption. Thus, in an underground electrical vault, electrical conduits should be cushioned against shock, particularly where the vault is located beneath a roadway. The same considerations apply to a pipeline passing through a culvert and in other applications. Sealing may also be necessary for electrical or thermal purposes, and cathodic protection at the seal may be essential.

B. The Prior Art

In the construction of seals for pipes and other conduits projecting through walls in vaults, pits, culverts, and other underground structures, a variety of seal constructions have been used. For example, tapered plugs of relatively resilient material have been employed. Oakumlead packing ring combinations have been utilized, much like the seals incorporated in waste pipes in plumbing systems. These relatively conventional seals have a high tendency toward failure. Furthermore, they may be costly and time consuming in installation and may require a high degree of skill on the part of the workman assembling the seal.

Another form of seal or packing suitable for applications of this kind is shown in Mainprize U.S. Pat. No. 2,964,342. The Mainprize patent employs a cylindrical sealing body of rubber or similar elastomer material with pressure rings embedded in the opposite faces of the rubber cylinder. A series of bolts connect the two pressure rings, being threaded into appropriate connectors mounted on one of the rings, pulling the pressure rings toward each other. The resultant axial compression of the cylindrical rubber body causes that member to expand circumferentially and seal the space between a conduit that runs axially through the body member and an encompassing wall opening.

The Mainprize construction is an improvement over some earlier and more conventional seal arrangements, but in turn offers some difficulties. For example, the Mainprize seal assembly must be placed in the wall before the pipe or other conduit is extended therethrough or else must be moved into position along what may be a rather long length of pipe. Of perhaps greater importance, the construction shown in the Mainprize patent is suitable only for one particular size of conduit projecting through a wall opening of specific size, and cannot accommodate substantial changes either in the outside diameter of the conduit or the inside diameter of the wall opening.

A greatly improved modular seal construction is described in U.S. Pat. No. 3,528,668, of Bruce G. Barton, issued Sept. 15, 1970. The annular seal of the Barton patent is made up of a plurality of individual elastomer seal blocks, faced with two segmented pressure plate rings; the bolts that are used to contract the pressure plates also join the blocks in a ring structure. This affords a versatile and economical seal structure, with a single set of components usable for many different conduit sizes. The present invention is directed to improvements in seals of the kind disclosed in the Barton patent.

SUMMARY OF THE INVENTION

An annular shock-absorbing seal assembly constructed in accordance with the present invention comprises a plurality of individual seal blocks of resilient compressible elastomer material of given thickness, each having a bolt-receiving aperture extending through one end of the block in centered relation to the sides of the block. Each seal block has a projecting boss of arcuate configuration at the one end thereof and a recessed socket of complemental arcuate configuration at the opposite end of the block; the boss end of each block fits snugly into the socket end of the next adjacent block, the center of curvature of each arcuate boss corresponding to the axis of the bolt-receiving aperture in the same block and the center of curvature of the socket corresponding to the axis of the bolt-receiving aperture in the interfitting adjacent block. The assembly further comprises a corresponding plurality of pairs of pressure plates, one pair of plates associated with each adjacent pair of seal blocks on opposite edges thereof, each plate having a bolt-receiving aperture therein, and each plate spanning the juncture between the associated pair of seal blocks. A plurality of bolt members are utilized, each extending through the apertures in one pair of pressure plates and in one seal block to mount the pressure plate members on the block and to join the seal blocks in a complete annular assembly in which tightening of the bolt members compresses the seal blocks to expand the thickness of the seal blocks and complete a seal, and in which pivotal movement of any adjacent pair of seal blocks, relative to each other, retains the associated pressure plates in aligned relation spanning the junction of the seal blocks and maintains the seal blocks in substantial surface contact at their abutting ends.

BRIEF DESCRIPTION OF THE DRAWINGS

FIG. 1 is an exploded view of a part of an annular shock-absorbing seal assembly constructed in accordance with one embodiment of the present invention;

FIG. 2 is a front elevation view of approximately one-half of the seal assembly mounted in position of use;

FIG. 3 is a detail sectional view taken along line 3—3 of FIG. 2 showing the seal prior to compression;

FIG. 4 is a view similar to FIG. 3 but with the seal compressed;

DESCRIPTION OF THE PREFERRED EMBODIMENTS

Figure 5:
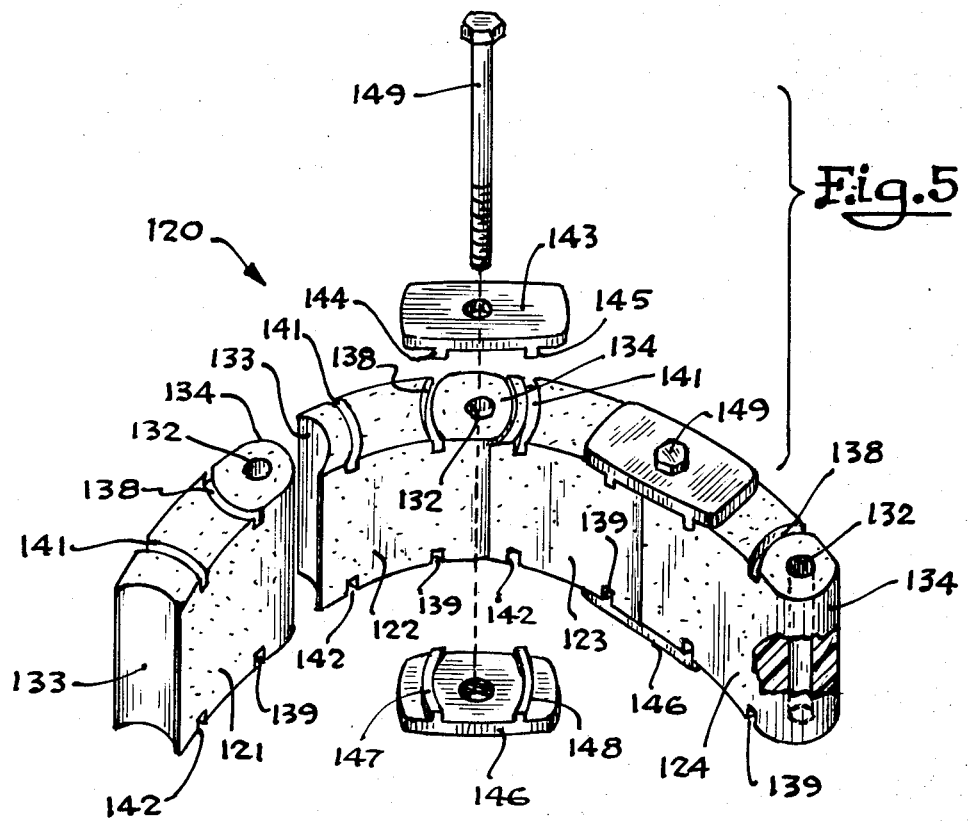
FIG. 5 is an exploded view, like FIG. 1, of another embodiment of the invention.

FIGS. 1 through 4 illustrate an annular shock absorbing seal assembly 20, formed of interconnected modular units, constructed in accordance with a preferred embodiment of the present invention. The seal assembly 20, FIGS. 1 and 2, comprises a series of individual seal blocks 21, 22, 23, 24 and 25 of given thickness T; for the complete seal, in the size shown, there would be a total of eight seal blocks. The actual number of seal blocks in assembly 20 may vary considerably, depending on the size of the conduit with which the seal assembly is used. The seal blocks are of molded resilient compressible elastomer material, such as rubber, neoprene or the like. Each block is provided with two bolt-receiving apertures that extend through the block in centered relation to the sides of the block. Thus, seal block 21 (FIG. 1) comprises two bolt-receiving apertures 31 and 32, and similar apertures are formed in each of the other blocks.

Seal block 21, which is typical of the other seal blocks, has a projecting arcuate boss 34 at the end of the block adjacent the bolt-receiving aperture 32 as best shown in FIG. 1. The boss 34 has a center of curvature that corresponds to the axis A of aperture 32. The opposite end of block 21 has a recessed socket 33 of arcuate configuration that is complemental to the configuration of boss 34. When the seal assembly is completed, as shown in FIG. 2, it can be seen that the center of curvature of the socket 33 in one block coincides with the axis of the bolt-receiving aperture in the boss end 34 in the next adjacent block.

Seal assembly 20 further comprises a plurality of pairs of pressure plates, one pressure plate being associated with each adjacent pair of seal blocks and being mounted on opposite edges thereof. As shown in FIG. 1, there are two pressure plates 35 and 36 mounted on opposite edges of the seal assembly in association with the adjacent pair of seal blocks 22 and 23. Pressure plate 35 comprises a molded plastic insulator plate member 37 into which a steel insert 38 fits, the steel insert 38 nesting in a depression 39 in insulator plate 37. Pressure bolt 36 is of similar construction, and comprises a plastic or other insulator element 41 having a recess into which a steel plate member 42 fits. Each of the elements of the pressure plates 35 and 36 is provided with two bolt-receiving apertures spaced by a given distance D (FIG. 2); the two apertures 43 in plate 42 are preferably threaded to eliminate any necessity for separate nuts on the bolts that are used in assembling seal assembly 20.

Two bolt members 45 and 46 are utilized to mount the pressure plates 35 and 36 on seal blocks 22 and 23. Bolt 46 extends through the left-hand apertures in plate members 38 and 39 and through the boss-end aperture 32 in seal block 22, projecting through the left-hand aperture in plate 41 and being threaded into the left-hand aperture 43 in the steel plate member 42 (FIG. 1). Similarly, bolt 45 extends through the right-hand apertures in plate members 37 and 38, through the socket-end aperture 31 in seal block 23, through the right-hand aperture in plate 41, and into the threaded opening 43 in seal plate 42. A similar bolt and pressure plate assembly is provided at the juncture of each pair of seal blocks, completing an annular seal assembly as shown in FIG. 2.

In use, the annular seal assembly 20 is assembled complete except for just one of the bolts 45 or 46. The assembly is then wrapped around a pipe or other conduit 51 (FIG. 2) and the missing bolt is installed to complete the annular assembly. Ordinarily, the assembly will be of a size to fit relatively loosely around the conduit 51, although a fairly tight fit can be allowed in some applications. The assembly is then moved a short distance axially of conduit 51 into the space between conduit 51 and an encompassing opening or conduit 52 into which conduit 51 projects. In this manner the seal assembly is mounted in position of use as shown in FIGS. 2 and 3.

To complete the assembly, all of the plates 45 and 46 are tightened to compress the seal blocks, such as seal blocks 21 to 25, from edge to edge. This compression of the seal blocks in the one direction causes the seal blocks to expand in thickness, expanding in the only available direction, and completes a peripheral seal between the surfaces of the inner conduit 51 and the outer conduit 52, as shown in FIG. 4. The degree of compression of the seal blocks is not critical and need not be uniform throughout the seal, some differential being permissible to compensate for surface irregularities on conduits 51 and 52, or for minor axial misalignment of the two conduits. The resilient compressible nature of the seal blocks effectively precludes any damage to the seal structure that might result from over-tightening, unless wholly unreasonable force is applied in tightening the bolts.

As can be seen from FIGS. 1 and 2, any adjacent pair of seal blocks can be pivoted, relative to each other, to a substantial extent, without altering the nature of the seal assembly. Pivotal movement of any pair of seal blocks with respect to each other does not displace the pressure plates from their aligned relation in the assembly. The location of the pressure bolts in relation to the arcuate surfaces of the bosses 34 and sockets 33 maintains the seal blocks in substantial surface contact at their abutting ends, and also maintains the pressure plates in balanced position on the seal blocks, spanning each seal block junction. Maximum compression is thus obtained at the joints between the seal blocks, assuring a continuous peripheral seal between conduits 51 and 52. Moreover, additional seal blocks can be added to the assembly, increasing its diameter, without changing the operational characteristics of the seal in any way.

Figure 6:
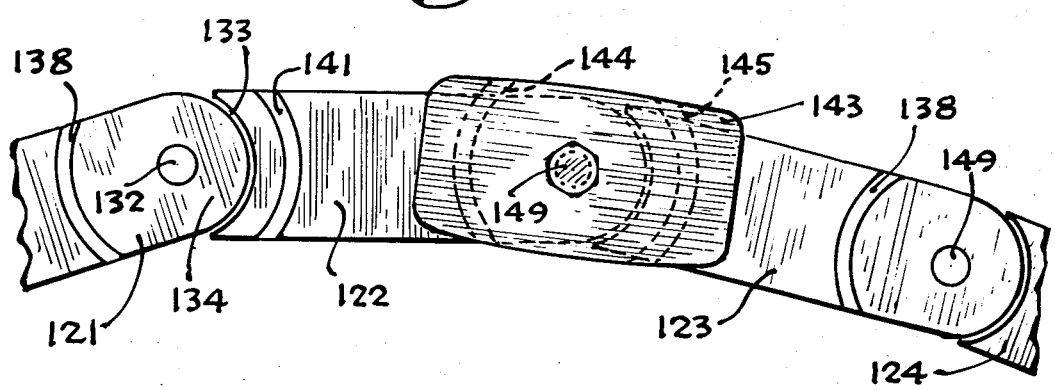
FIG. 6 is a detail end elevational view of the seal shown in FIG. 5.

FIGS. 5 and 6 show an annular shock absorbing seal assembly 120 that utilizes some of the structural features of assembly 20, but with some further structural variations. Thus, assembly 120 comprises a series of seal blocks, formed of rubber, neoprene, or other resilient elastomer material, exemplified by the blocks 121, 122, 123 and 124. Each of the seal blocks includes a concave arcuate socket end 133 and a complemental arcuate convex boss end 134. The seal blocks of assembly 120, however, are each provided with only one bolt-receiving aperture 132. The aperture 132 is located in the boss end 134 of the seal block, in each instance, and is coaxial with the curvature of the external surface of the boss 134. Aperture 132 is also coaxial with the arcuate socket 133 in the adjacent block when the assembly has been formed.

An arcuate groove 138 is molded in the outer edge of each seal block; the center of curvature of groove 138 is concentric with the axis of the bolt-receiving aperture 132 in the block. A corresponding arcuate groove 139 is provided in the opposite edge surface of the seal block, concentric with the axis of aperture 132. At the other end of the seal block, in each instance, there is an arcuate groove 141 in the outer edge of the block that is concentric with the arcuate end socket 133 of the seal block and that is concentric with the bolt-receiving aperture 132 of the next adjacent seal block when the assembly is put together. A similar arcuate groove 142, concentric with the concave arcuate socket 133, is afforded in the opposite edge of each block.

The two sets of pressure plate members disposed on opposite edges of the seal blocks in assembly 120 are somewhat different from the pressure plates of the previously described embodiment. Thus, each outer pressure plate 143 is of unitary construction and is provided with two arcuate ribs 144 and 145 to fit into the arcuate slots 138 and 141, respectively, of two assembled adjacent seal blocks. Similarly, each of the pressure plates 146 for the inner edge of the assembly is provided with two arcuate ribs 147 and 148 to fit into the grooves 139 and 142, respectively, on the seal blocks. With this construction, it can be seen that an articulated assembly is afforded. Each seal block can be pivoted, to a limited extent, relative to the adjacent seal blocks. This assures a good seal even though there may be a large variation in total numbers of seal blocks in the assemblies. Each pair of pressure plates is mounted in place by a bolt 149 that extends through the upper plate 143 and is threaded into the lower plate 146.

Each embodiment of the invention provides maximum compression centered on the joint between adjacent seal blocks, assuring maximum integrity for the completed seal even in those instances where it may be necessary to stretch the seal blocks slightly in fitting them around the inner conduit. Each can be readily constructed to afford cathodic protection, electrically isolating the inner and outer conduits. Full surface contact between adjacent seal blocks is assured at all times, even when the assembly is stretched somewhat in installation. Moreover, each can be quickly and conveniently increased or decreased in length by removal and replacement of a minimum number of bolts.

I claim:

1. An annular shock-absorbing seal assembly formed of interconnected modular units, comprising:
   a plurality of individual seal blocks of resilient compressible elastomer material of given thickness, each having a bolt-receiving aperture extending through one end of the block in centered relation to the sides of the block;
   each seal block having a projecting boss of arcuate configuration at said one end thereof and a recessed socket of complemental arcuate configuration at the opposite end thereof, the boss end of each block snugly fitting into the socket end of the next adjacent block, the center of curvature of said arcuate boss corresponding to the axis of said aperture in the same block and the center of curvature of said socket corresponding to the axis of the bolt-receiving aperture in the interfitting adjacent block;
   a corresponding plurality of pairs of pressure plates, one pair of plates associated with each adjacent pair of seal blocks on opposite edges thereof, each plate having a bolt-receiving aperture therein, and each plate spanning the juncture between the associated pair of seal blocks; and
   a plurality of bolt members extending through the apertures in the pressure plates and in the seal blocks to mount said pressure plate members on said blocks and join the seal blocks in a complete annular assembly in which tightening of the bolt members compresses the seal blocks to expand the thickness of the seal blocks and complete a seal, and in which pivotal movement of any adjacent pair of seal blocks, relative to each other, retains the associated pressure plates in aligned relation spanning the junction of the seal blocks and maintains the seal blocks in substantial surface contact at their abutting ends;
   each seal block including a pair of arcuate alignment grooves, in one edge of the block, one groove adjacent to and concentric with said bolt-receiving aperture at said one end of the block and the other groove concentric with said socket at the opposite end of the block, and at least one pressure plate in each pair including a pair of complementary arcuate guide ribs fitting into the grooves in two adjacent blocks to maintain the blocks in alignment with the pressure plate and with each other.

2. An annular shock-absorbing seal assembly according to claim 1 in which at least a part of each pressure plate is formed of a molded insulator material to insulate said bolts from electrical contact with any conduit on which the seal assembly is mounted.

3. An annular shock-absorbing seal assembly according to claim 1 in which each seal block includes two pairs of arcuate alignment grooves, one pair in each edge of the block, and in which all pressure plates in the assembly include complementary guide ribs interfitted with said alignment grooves.

4. An annular shock-absorbing seal assembly formed of interconnected modular units, comprising:
   a plurality of individual seal blocks of resilient compressible elastomer material of given thickness, each having two bolt-receiving apertures extending through the full height of the block and spaced a predetermined distance from each other, one aperture being located adjacent one end of the block in centered relation to the sides of the block and the other located approximately in the center of the block;
   each seal block having a full-height projecting boss of arcuate configuration at said one end thereof and a full-height recessed socket of complemental arcuate configuration at the opposite end thereof, the boss end of each block snugly fitting into the socket end of the next adjacent block, the center of curvature of said arcuate boss corresponding to the axis of said aperture in the same block and the center of curvature of said socket corresponding to the axis of the one bolt-receiving aperture in the interfitting adjacent block;
   a corresponding plurality of pairs of pressure plates, one pair of plates associated with each adjacent pair of seal blocks on opposite sides thereof, each plate having two bolt-receiving apertures therein, spaced from each other by said predetermined distance, and each plate spanning the juncture between the associated pair of seal blocks; and
   a plurality of bolt members extending through the apertures in the pressure plates and in the seal blocks to mount said pressure plate members on said blocks and join the seal blocks in a complete annular assembly in which tightening of the bolt members compresses the seal blocks to expand the thickness of the seal blocks and complete a seal, and in which pivotal movement of any adjacent pair of seal blocks, relative to each other, retains the associated pressure plates in aligned relation spanning the junction of the seal blocks and maintains the seal blocks in conect at their abutting ends.

5. An annular shock-absorbing seal assembly according to claim 4 in which at least a part of each pressure plate is formed of a molded insulator material to insulate said bolts from electrical contact with any conduit on which the seal assembly is mounted.

* * * * *